June 23, 1964     M. YOLIN     3,138,323
METHOD AND MEANS FOR THE MANUFACTURE OF TWO COLOR INDICIA
BEARING DRUMS FOR METERS AND SIMILAR APPARATUS
Filed Jan. 3, 1961     3 Sheets-Sheet 1
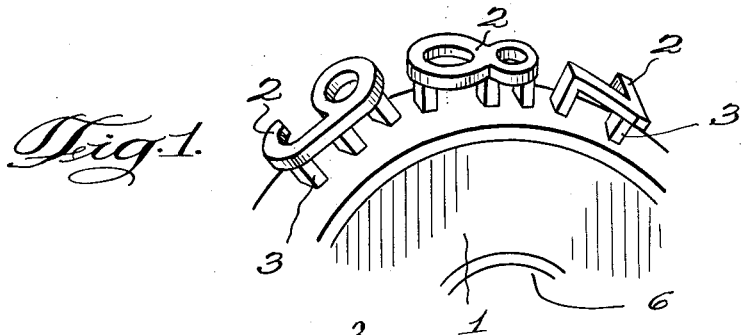
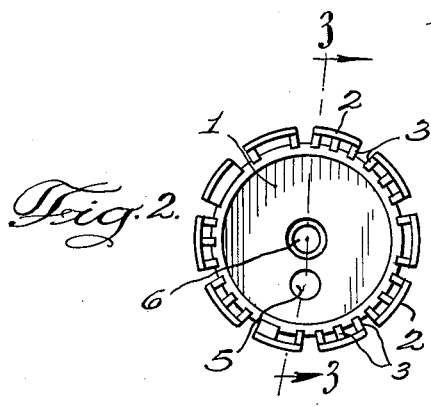 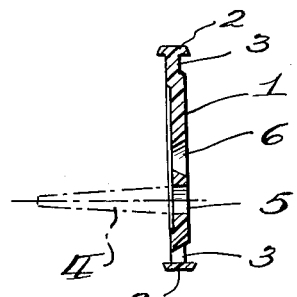
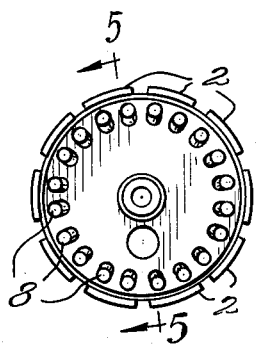 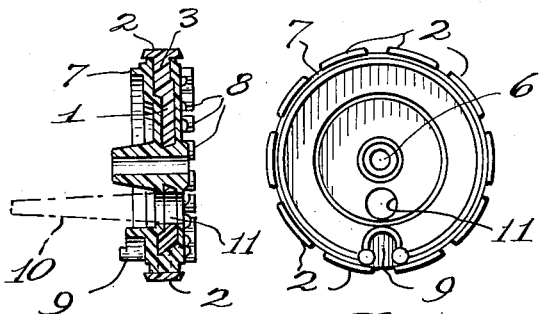
Inventor
Maurice Yolin
By Louis Bernat
Attorney

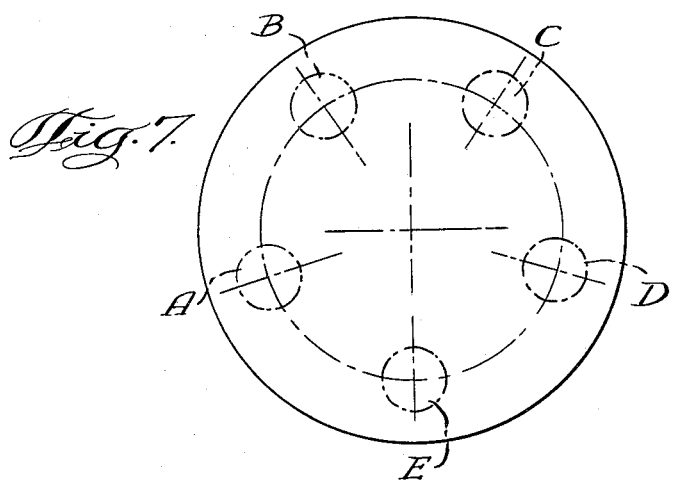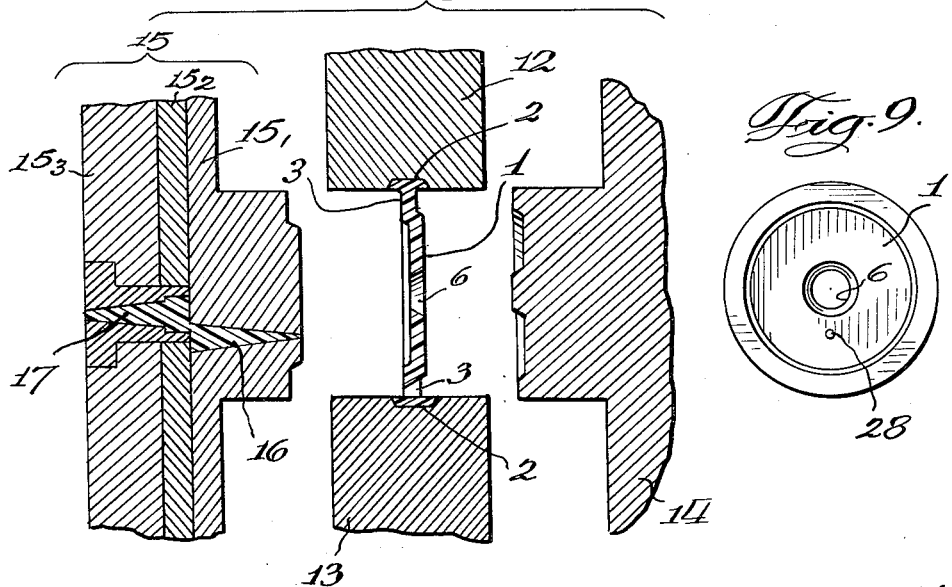

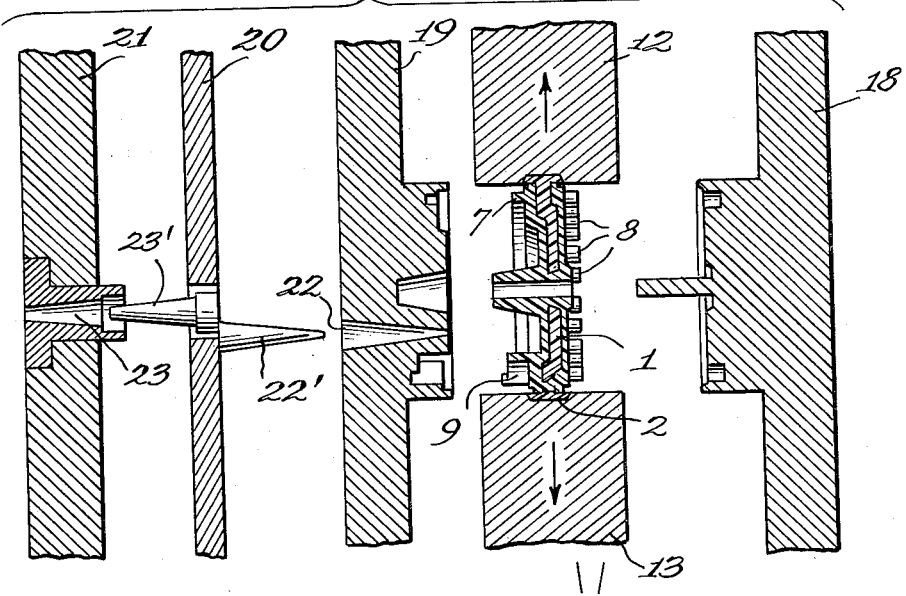
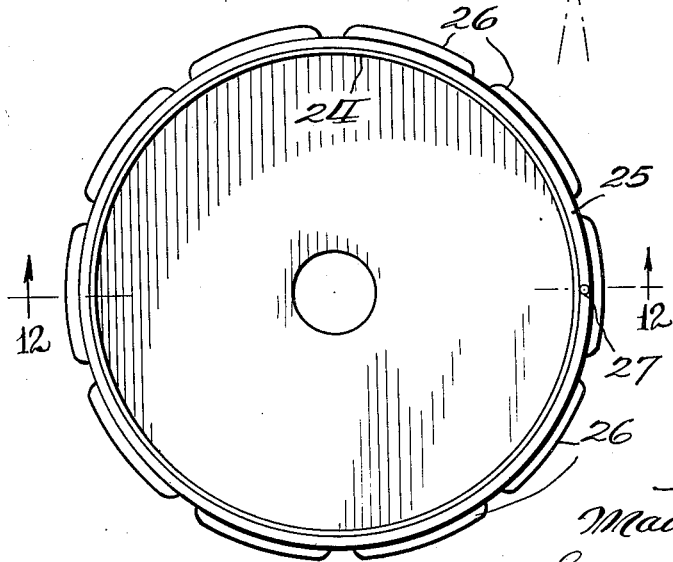

United States Patent Office 3,138,323
Patented June 23, 1964

3,138,323
METHOD AND MEANS FOR THE MANUFACTURE OF TWO COLOR INDICIA BEARING DRUMS FOR METERS AND SIMILAR APPARATUS
Maurice Yolin, Paris, France, assignor to Compagnie des Compteurs, Paris, France, a company of France
Filed Jan. 3, 1961, Ser. No. 80,471
10 Claims. (Cl. 235—1)

This application relates generally to indicia bearing drums and more particularly to new and improved indicia bearing drums of a type adapted for use in indicating meters and similar apparatus.

Those skilled in the art of indicating meters are familiar with the use of rotatable drums bearing numerical indicia in counters, electric meters, gas meters, liquid meters, time meters, speedometers and the like. Generally the numerical indicia has been printed on the surface of the drum or it has been molded on the surface of the drum such that the outermost peripheral surface of the numbers are coplanar with the external peripheral surface of the drum. Further, it has been known to form the numerals and the drum with different colors to facilitate the reading of the numerals during the meter indicating function. However, the constructions of the prior art have not been entirely satisfactory due to certain limitations in the readability and size of the numerals when they are positioned substantially coplanar with the drum peripheral surface.

Accordingly, it is an object of this invention to provide a new indicia bearing drum having improved readability over the indicia bearing drums of the prior art.

It is another object of this invention to provide an improved method and means for molding indicia bearing drums wherein the indicia is molded in relief around the external peripheral surface of the drum.

It is still another object of this invention to provide an improved method and means for molding indicia in relief around the external peripheral surface of a rotatable drum wherein the indicia and drum surfaces are molded in different colors to facilitate the readability of the indicia.

It is a further object of this invention to provide a multiple color indicia bearing drum by a two stage molding process wherein indicia of a first color is molded in relief relative to the external peripheral surface of a drum of a second color.

It is a still further object of this invention to provide a multiple color indicia bearing drum, as above, comprising a thin disc having a plurality of outwardly extending indicia bearing stems spaced around the peripheral surface of the drum.

It is still another object of this invention to provide a multiple color indicia bearing drum, as above, comprising a cylindrical cup having molded thereon a first colored ring with outwardly extending indicia bearing stems spaced thereon and a second ring of a different color covering the first ring with the exception of said indicia which is in relief with respect to the external peripheral surface of said second ring.

It is still another object of this invention to provide a new and improved method for molding a multiple color indicia bearing drum comprising the steps of molding in a first mold a relatively thin indicia bearing disc of one color on a mold frame and then transferring the mold frame to a second mold to add the remaining portions of the drum in a second color to the indicia bearing disc, thereby completing a unitized multiple color drum assembly in two molding steps.

It is a still further object of this invention to mold a multiple color drum having indicia in relief relative to the drum periphery utilizing pin point gating in a two step molding process so as to eliminate prior art problems of gate or sprue removal from the finished drum.

It is still another object of this invention to provide a new method and means for molding a two color drum having relief indicia extending around the drum periphery characterized by relative simplicity of manufacture, economy of construction, and the advantages of attractive appearance and easy readability.

The above and other objects and features which characterize the invention are pointed out with particularity in the claims annexed to and forming a part of this specification. For a better understanding of the invention, however, its advantages and specific objects attained by its use, reference is had to the accompanying drawings and descriptive matter in which are shown several illustrative embodiments of the invention.

In the drawings:

FIGURE 1 is a perspective view, on a generally enlarged scale, of a part of the indicia bearing disc in accordance with one embodiment of the invention;

FIGURE 2 is an elevational view of an entire indicia bearing disc, as illustrated in FIGURE 1;

FIGURE 3 is a cross-sectional view taken substantially as shown along line 3—3 of FIGURE 2;

FIGURE 4 is a front elevational view of an indicia bearing drum assembly in accordance with one embodiment of the invention;

FIGURE 5 is a cross-sectional view taken substantially as shown along line 5—5 of FIGURE 4;

FIGURE 6 is a rear elevational view of the indicia bearing drum assembly shown in FIGURE 4;

FIGURE 7 is a schematic representation of the plate of a transfer device having multiple posts for carrying out the multiple step molding process embodying the invention;

FIGURE 8 is an exploded view illustrating the molding of an indicia bearing disc utilizing a pin-point gating process in accordance with the invention;

FIGURE 9 is an elevational view of a disc molded in accordance with the process illustrated in FIGURE 8;

FIGURE 10 is an exploded view illustrating the molding of the unitized drum assembly, including the molded disc of FIGURE 8, utilizing a pin-point gating process in accordance with the invention;

FIGURE 11 is an elevational view of another embodiment of the unitized drum assembly molded in accordance with a further feature of the invention; and FIGURE 12 is a cross-sectional view taken substantially as shown along line 12—12 of FIGURE 11.

Referring now to the drawing, and more particularly to FIGURES 1, 2 and 3 thereof, there is shown the construction of an indicia bearing disc in accordance with one illustrative embodiment of the invention. Advantageously, the disc 1 is molded of a suitable plastic material, such as polyethylene, polystyrene and the like, and comprises a relatively thin body portion having a pair of opposed planar surfaces with a central opening 6 and offset opening 5. In accordance with a feature of this invention, a plurality of indicia forming characters 2 is spaced around the peripheral edge portion of the disc and is raised in relief with respect to the body portion of the disc as by means of the stems 3. As explained in greater detail hereinbelow, the indicia bearing disc 1 advantageously is molded in a single step which is the first stage of the drum forming process.

In the molding of disc 1, as illustrated in FIGURE 3 of the drawing, a casting gate or sprue 4 may be present on the disc 1, and such sprue 4 (shown in broken line form in FIGURE 3) may be removed by any suitable means, such as drilling.

The completed drum assembly is illustrated in FIGURES 4, 5 and 6 of the drawing. As there shown, the disc 1 has a cap member molded to its opposed planar faces, said cap member comprising a flange portion 7, a plurality of pins or cogs 8, a driving buckle 9, and a central boss or bearing. In accordance with a feature of this invention the cap member is molded in a different color than the disc 1 and the flange portion 7 of the cap member is of a smaller radial extent than the indicia forming characters 2 of the disc 1. Thus, those skilled in the art will appreciate that due to the difference in color between the disc 1 and cap member, and further due to the difference in radial extent between the indicia forming characters 2 of the former and the flange portion 7 of the latter, the readability of the indicia forming characters 2 is greatly facilitated over that of the prior art devices.

In the molding of the cap member, the cone shaft sprue 10 (shown in broken lines in FIGURE 5) may be formed. As explained hereinabove, the sprue 10 may be removed by drilling, to form the aperture 11 in alignment with the aperture 5 of the disc 1.

FIGURE 7 of the drawing illustrates a transfer device which may be used in the molding of the drum assembly described herein. As schematically illustrated the transfer device comprises the posts A, B, C, D and E. During the molding process, the disc 1 is molded at the post A by means of a first mold having the indicia forming die positioned around the edge of the molded disc and a second mold having the face forming die positioned at opposite sides of the disc body portion.

After the disc 1 is molded at post A, the disc 1 with the indicia forming die still attached is moved automatically to post B. At post B the disc is drilled to remove the sprue 4 and to form the opening 5, as illustrated in FIGURE 3.

The disc 1, still with its indicia forming die attached, then is transferred to post C. The cap forming mold is present at post C and the mold containing the indicia forming die together with the disc 1 is automatically positioned in the second mold at post C. The cap is molded by injecting a plastic substance of a different color around the disc 1 such that the final drum assembly, as shown in FIGURES 4, 5 and 6 is obtained.

This drum assembly, still being carried by the indicia forming die mold, is taken out of the cap mold and is transferred to post D. At post D the drum assembly is drilled to remove the sprue 10, as indicated in FIGURE 5, and the drum assembly is automatically transferred to post E. At post E the completed drum assembly is removed from the indicia forming die mold and is then ready for assembly into a suitable indicating meter.

One advantageous method of molding the disc 1 is shown in FIGURES 8 and 9 of the drawing. As there shown, the disc 1 is supported by the indicia forming die mold members 12 and 13. The molds 14 and 15 having the disc face forming dies are shaped to fit between the molds 12 and 13 such that upon the injection of a suitable plastic material through the nozzles 16 and 17, the disc 1 is molded. After the disc 1 is molded, the mold members 14 and 15 are opened, as illustrated in FIGURE 8, and the disc 1 carried by the indicia forming die molds 12 and 13 is transferred to a different position for the second stage of the assembly process.

As illustrated in FIGURE 8, pin-point gating molding methods advantageously may be used to eliminate the necessity of removing molding gates or sprues from the molded disc. Thus, it can be seen that the nozzle 17 extends through the mold member 15$_3$ and the mold member 15$_2$ into communication with the nozzle 16 in the mold member 15$_1$. The nozzle 16 terminates in a restricted opening to effect pin-point gating during the molding of disc 1 in accordance with techniques known to those skilled in the art. The utilization of pin-point gating for the molding of disc 1 eliminates gates or sprues from the finished mold, and therefore eliminates any need for drilling gates or sprues as described above with respect to FIGURES 1 through 6.

After the disc 1 has been molded, as shown in FIGURE 8, the disc is transferred by means of the mold portions 12 and 13 to which the disc is attached to a second stage mold to enable molding of a cap on the disc, as illustrated in FIGURE 10 of the drawing. As there shown, the finished drum assembly is illustrated by the reference numerals 1, 2, 7, 8 and 9 as positioned between the mold parts 12 and 13, and the mold parts utilized for molding of the cap are shown in an exploded fashion to better illustrate their construction. Thus, the mold parts 18 and 19 include the cap forming dies and are movable into and out of position with respect to the mold parts 12 and 13. The mold parts 18 and 19 are positioned, as shown in the drawing, after the drum assembly is molded. The mold part 19 includes a shaped opening 22 for enabling the pin-point gating molding technique to be utilized, as explained hereinabove. The mold part 20 includes the casting nozzles 22' and 23' and the mold part 21 includes the shaped opening 23 which cooperates with the nozzle 23'.

In the operation of the molding process in accordance with the present invention all of the parts of the mold shown in FIGURE 8—namely mold parts 12, 13, 14 and 15 are fitted together and a suitable plastic substance is injected through the opening 17 and the opening 16 to form the disc 1 within the dies. When the molding of disc 1 is terminated the movable center molds 14 and 15 are separated, and it will be appreciated by those skilled in the art, that this separation of the mold 15 from the disc 1 serves to eliminate the molding gate or sprue from the disc.

At this time the frame containing the indicia forming dies 12 and 13 together with the disc 1 is transferred to a second mold without being opened. No direct manual handling thus is necessary of the disc 1, which, by itself, is extremely fragile. The indicia forming dies, of which only mold parts 12 and 13 are shown in the drawing, then are locked in place, as with bolts, in the second mold. When this positioning is done, the various mold parts 18, 19, 20 and 21 of the second mold are fitted together. The three mold parts 19, 20 and 21 then are in the same position with respect to the disc 1 as were the mold parts 15$_1$, 15$_2$ and 15$_3$ of the first mold shown in FIGURE 8. The injected plastic material then passes through the opening 23 and the opening 22 communicating therewith to complete the molding of the drum assembly.

The mold then is opened and the parts 19, 20 and 21 are separated as indicated in FIGURE 10, to eliminate any gate or sprue which may be included therewith. At this time the indicia forming die parts can be removed from the drum assembly and the latter is ready to be included in a suitable indicating meter.

Those skilled in the art will appreciate that the transfer device illustrated in FIGURE 7 can be simplified with respect to the last described two stage molding operation. Thus, the first stage of the molding can take place at post A, the disc can be removed from the mold at post B, the second phase of the molding can take place at post C, the drum assembly can be removed from the mold at post D, and at post E the indicia forming dies can be removed from the final drum assembly. An alternative embodiment of the invention is shown in FIGURES 11 and 12 of the drawing. As there shown, the drum assembly comprises a metallic cup 24 having a planar member with a cylindrical flange connected thereto. A first molded ring 26 is molded around the outside cylindrical surface of the cup 24, which molded ring 26 is provided with outwardly extending stems and indicia forming characters. Then the molded ring 25 is molded in a second stage molding step around the first molded ring 26 with the exception that suitable shaped openings are provided in molded ring 25 to permit the indicia forming characters to extend through ring 25 and outwardly therefrom. In accordance with a feature of this invention the molded ring 26 is molded in a different color than the molded ring 25 and this color difference together with the indicia forming characters being in relief with respect to the molded ring 25 facilitates readability of the indicia.

Those skilled in the art will appreciate that drum assemblies with any number of figures can be made in accordance with the above described techniques and that the indicia may be letters, numbers or any desired symbols. It further will be appreciated that the above described inventive technique can be used with any types of molds wherein the center part of the mold bearing the disc can be removed and transferred to a second mold without being removed from the disc.

Various changes may be made in the structural details and process steps of the invention without departing from the real spirit and purpose of the invention. Accordingly it is intended to cover by the appended claims any modified forms of structure or use of mechanical equivalents or modified process steps which may be reasonably included within their scope.

What is claimed as the invention is:

1. The improvement of an indicia bearing rotatable drum assembly for use in indicia indicating apparatus comprising the combination of a thin cylindrical disc having a pair of opposed planar faces and a peripheral edge, said disc being molded in a first color, a plurality of indicia forming characters spaced around the peripheral edge of said disc, a plurality of stems extending outwardly from said peripheral edge, said indicia forming characters extending outwardly from said disc and each of said indicia forming characters being spaced from said disc by said stems, a cap member molded to said disc to substantially cover the opposed planar faces of said disc, said cap member being molded in a second color and having a flanged edge portion of smaller radial extent than said disc, said indicia forming characters being in relief relative to the external peripheral surface of said flanged edge portion to facilitate readability of said indicia forming characters, and bearing means at the center of said drum assembly to enable it to be rotatably driven to place desired ones of said indicia forming characters in indicating position.

2. The improvement of an indicia bearing rotatable drum assembly for use in indicia indicating apparatus comprising the combination of a thin cylindrical disc having a pair of opposed planar faces and a peripheral edge, said disc being molded in a first color, a plurality of indicia forming characters spaced around the peripheral edge of said disc and spaced outwardly therefrom, said indicia forming characters being irregular marginal edges, a plurality of stems extending radially outwardly from said peripheral edge of said disc for supporting each of said indicia forming characters in spaced relationship to the peripheral edge of said disc, a cap member molded to said disc to substantially cover the opposed planar faces of said disc, said cap member being molded in a second color and having a flanged edge portion of smaller radial extent than said disc to place said indicia forming characters in relief relative to said flanged edge portion to facilitate readability of said indicia forming characters, and bearing means at the center of said drum assembly to assemble it to be rotatably driven to place desired ones of said indicia forming characters in indicating position, said cap member and said disc defining an integrally formed indicia bearing rotatable drum assembly.

3. The improvement of an indicia bearing rotatable drum assembly for use in indicia indicating apparatus comprising the combination of a thin cylindrical disc having a pair of opposed planar faces and a peripheral edge, a plurality of indicia forming characters spaced around the peripheral edge of said disc, means for supporting said indicia forming characters in relief with respect to the peripheral edge of said disc, said indicia forming characters having irregular configurations, and a cap member molded to said disc to substantially cover the opposed planar faces of said disc, said cap member having a flanged edge portion of smaller radial extent than said disc and being complementary to said irregular configurations of said indicia forming characters to place said indicia forming characters in relief relative to said flanged edge portion.

4. The improvement of an indicia bearing rotatable drum assembly for use in indicia indicating apparatus comprising the combination of a cylindrical cup member having an annular disc portion and a peripheral flange portion positioned around the edge of said disc portion, a first ring member molded on the peripheral flange portion of said cylindrical cup member and having indicia forming characters extending outwardly from said cup member, a second ring member molded around said first ring member, said second ring member having shaped openings therein and being of a smaller radial extent than said indicia forming characters such that the latter is raised in relief relative to said second ring member, said first and second ring members being molded in different colors to facilitate readability of said indicia forming characters, and bearing means at the center of said drum assembly to enable it to be rotatably driven to place desired ones of said indicia forming characters in indicating position.

5. The improvement of an indicia bearing rotatable drum assembly for use in indicia indicating apparatus comprising the combination of a cylindrical cup member having an annular disc portion and a peripheral flange portion positioned around the edge of said disc portion, a first ring member molded on the peripheral flange portion of said cylindrical cup member and having indicia forming characters extending outwardly from said cup member, and a second ring member molded around said first ring member, said second ring member having shaped openings therein and being of a smaller radial extent than said indicia forming characters such that the latter is raised in relief relative to said second ring member to facilitate readability of said indicia forming characters.

6. The improvement of an indicia bearing rotatable drum assembly for use in indicia indicating apparatus comprising the combination of a cylindrical cup member having an annular disc portion and a peripheral flange portion positioned around the edge of said disc portion, a first ring member molded in one color on the peripheral flange portion of said cylindrical cup member and having indicia forming characters extending outwardly from said cup member, a second ring member molded in a second color around said first ring member, said second ring member being of a smaller radial extent than said indicia forming characters such that the latter is raised in relief relative to said second ring member to facilitate readability of said indicia forming characters.

7. The method of molding an indicia bearing rotatable drum assembly for use in indicia indicating apparatus comprising the steps of molding a relatively thin indicia bearing disc of a first color in a first mold having an indicia forming die at the peripheral edge surface of said disc and a face forming die at the opposed faces of said disc, removing the face forming die from said disc and transferring the disc with the indicia forming die attached thereto to a second mold having a cap forming die, molding a cap of a second color to the opposed faces of said disc, said cap being molded with a smaller radial extent than said disc to enable the indicia to extend outwardly in relief relative to the peripheral edge of said cap, and removing said cap forming die and said indicia forming die from the drum assembly.

8. The method of molding an indicia bearing rotatable drum assembly for use in indicia indicating apparatus comprising the steps of molding a relatively thin indicia bearing disc of a first mold having an indicia forming die at the peripheral edge surface of said disc and a face forming die at the opposed faces of said disc, removing the face forming die from said disc, transferring the disc by the attached number forming die to a second mold having a cap forming die, and molding a cap to the opposed faces of said disc, said cap being molded with a smaller radial extent than said disc to enable the indicia to extend outwardly in relief relative to the peripheral edge of said cap.

9. The method of molding a multi-color indicia bearing rotatable drum assembly for use in indicia indicating apparatus comprising the steps of molding an indicia bearing disc of a first color in a first mold having an indicia forming die at the peripheral edge surface of said disc and a face forming die at the opposed faces of said disc, removing the face forming die from said disc together with all molding gates and sprues, transferring the disc by its attached number forming die to a second mold having a cap forming die, molding a cap of a second color to the opposed faces of said disc, said cap being molded with a smaller radial extent than said disc to enable the indicia to extend outwardly in relief relative to the peripheral edge of said cap, and removing said cap forming die and said indicia forming die from the drum assembly together with all molding gates and sprues to permit said drum assembly to be used in an indicia indicating apparatus.

10. The method of molding an indicia bearing rotatable drum assembly adapted for use in indicia indicating apparatus comprising the steps of molding a relatively thin cylindrical disc of a first color having a plurality of stems extending radially from the peripheral edge of said disc and having a plurality of indicia forming characters supported on said stems in spaced relationship to the peripheral edge of said disc, and molding a cap of a second color to substantially cover the disc, the cap portion covering the peripheral edge of the disc being of smaller radial extent than said disc and being complementary to the configurations of each of said indicia forming characters to place said indicia forming characters in relief relative to the exterior of the peripheral edge of the cap portion and thereby visible on both the upper and lateral sides thereof.

References Cited in the file of this patent

UNITED STATES PATENTS

| | | |
|---|---|---|
| 1,592,568 | Orth | July 13, 1926 |
| 2,242,699 | Flader | May 20, 1941 |
| 2,279,337 | Niemann | Apr. 14, 1942 |
| 2,762,080 | Heinze | Sept. 11, 1956 |
| 2,940,125 | Beucker | June 14, 1960 |
| 2,978,751 | Bright | Apr. 11, 1961 |

FOREIGN PATENTS

| | | |
|---|---|---|
| 81,812 | Norway | May 18, 1953 |
| 101,236 | Sweden | Apr. 1, 1941 |
| 168,043 | Australia | Apr. 8, 1954 |